Dec. 20, 1960 J. P. HEISS 2,965,373
LEVELING VALVE
Filed April 28, 1958 3 Sheets-Sheet 1
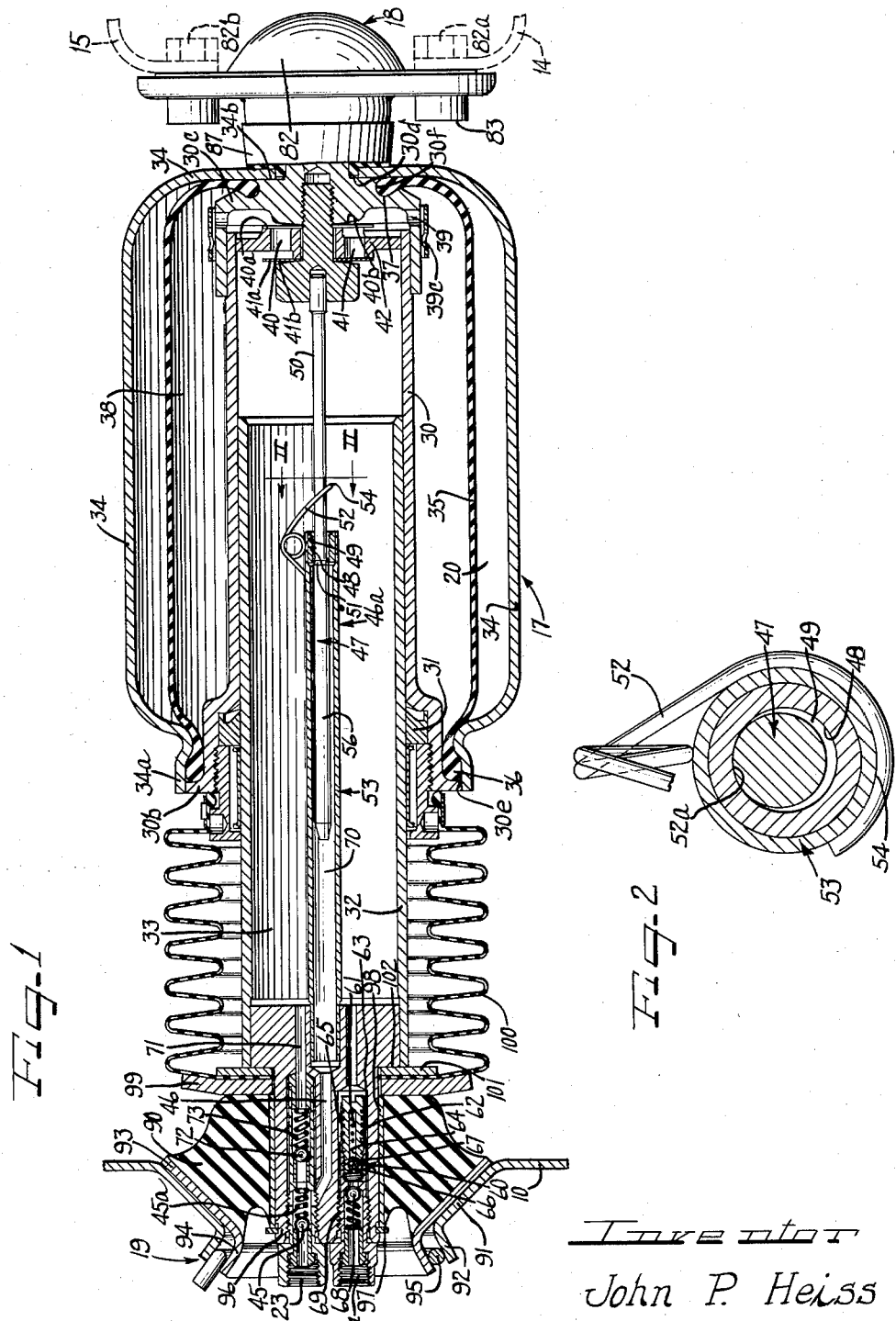
Inventor
John P. Heiss
by Hill, Sherman, Meroni, Gross + Simpson Attys Dec. 20, 1960
J. P. HEISS
2,965,373
LEVELING VALVE
Filed April 28, 1958
3 Sheets-Sheet 2
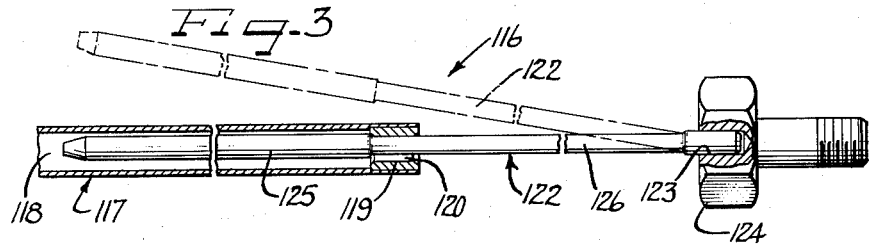
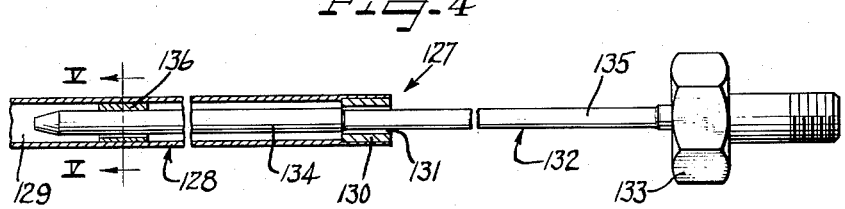
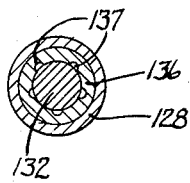
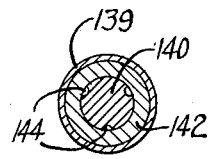
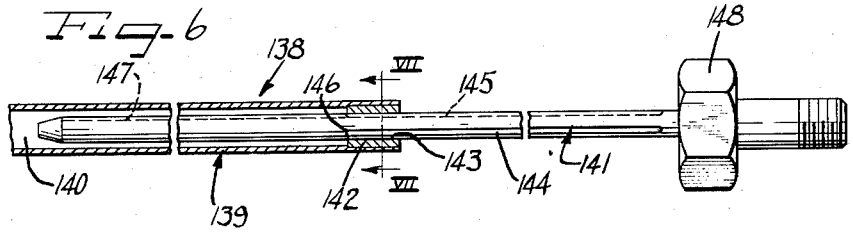
Inventor
John P. Heiss
by Hill, Sherman, Meroni, Gross & Simpson
Attys Dec. 20, 1960  J. P. HEISS  2,965,373
LEVELING VALVE
Filed April 28, 1958  3 Sheets-Sheet 3
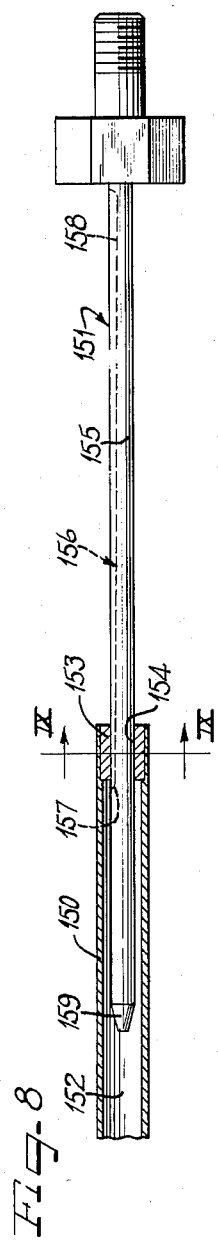
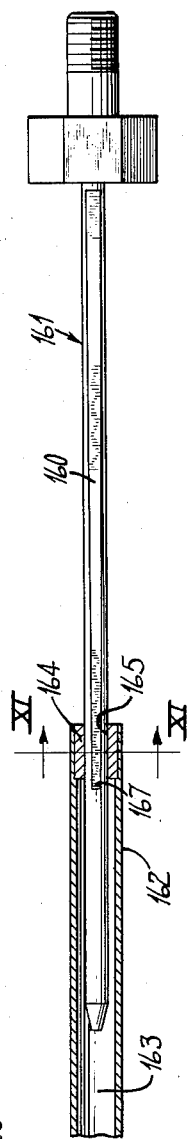
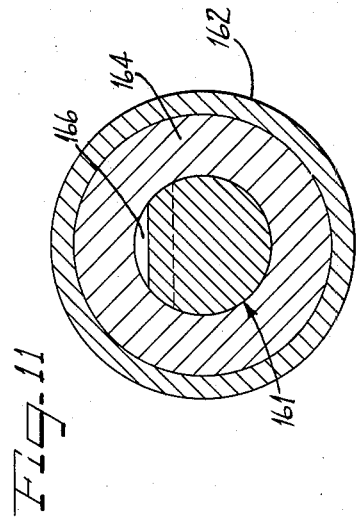
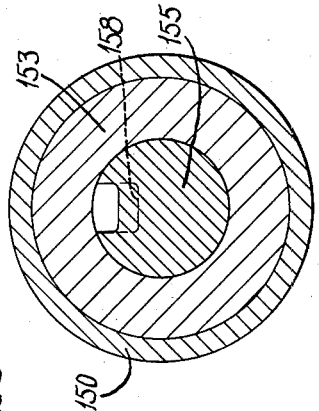
Inventor
John P. Heiss
by Hill, Sherman, Meroni, Gross & Simpson Attys

United States Patent Office 2,965,373
Patented Dec. 20, 1960

2,965,373

LEVELING VALVE

John P. Heiss, Flint, Mich., assignor to Thompson Ramo Wooldridge Inc., a corporation of Ohio Filed Apr. 28, 1958, Ser. No. 731,520

7 Claims. (Cl. 267—64)

The present invention relates to an improved resilient support and leveling mechanism for a road vehicle and more particularly to the provision of an improved valve arrangement for controlling the flow of a hydraulic liquid in a hydro-pneumatic suspension system for a vehicle wherein vibration of the valve parts which creates noise and results in metal fatigue of parts is avoided.

In hydro-pneumatic systems of the type referred to, resilient suspension combined with automatic leveling of a vehicle is achieved. A gas, such as air, is contained in an expansible chamber for resilient suspension and a supply of pressurized fluid such as liquid, is supplied to a suspension unit in quantities which control the level of the vehicle. Problems have been encountered, especially in a system employing a continuous flow of leveling fluid wherein valves having a control rod or stem projecting into a flow orifice are used. The parts of the valve such as the valve stem have been found to vibrate at high frequencies with attendant noise such as high frequency squeals and wear of parts and metal fatigue. This will occur when the vehicle is moving and can occur when the vehicle is standing still. A reason for continued vibration and accompanying noise is the orifice coefficient between a centered and uncentered valve rod causing the rod to motor in self-sustaining excitement.

A feature of the present invention is the provision of a flow control valve such as the type having telescoping parts, in a vehicle supporting strut in which the valve parts are maintained in fixed relation lateral positions to avoid lateral vibrations and the resultant accompanying undesirable effects.

Accordingly, an important object of the invention is to provide an improved hydro-pneumatic suspension and leveling mechanism for a vehicle wherein a constant flow arrangement is employed with an improved control valve which will not vibrate and generate noise, and which will have increased operating life due to elimination of vibration between parts eliminating wear and metal fatigue.

Another object of the invention is to provide an improved valve assembly employing moving valve parts which move longitudinally to vary a flow of liquid therethrough, and wherein lateral vibration between parts is eliminated.

Another object of the invention is to provide an improved valve assembly employing telescopically moving valve parts for obtaining varying rates of flow, and which is especially well adapted to severe flow conditions of widely varying flow quantities and pressures.

Another object of the invention is to provide a valve assembly which is capable of successful operation in a hydro-pneumatic telescopic strut for suspension of a vehicle wherein the valve must permit continuous flow of hydraulic liquid, and must vary the flow to achieve automatic leveling of the vehicle, and be capable of withstanding the extreme hydraulic shocks which occur from road shocks at high speed movement of the vehicle.

Another object of the invention is to provide an improved arrangement in a valve having telescoping parts with the parts being of varying cross section to control flow through the valve, wherein lateral movement between the parts is eliminated.

Other objects and advantages will become more apparent with the disclosure and teaching of the principles of the present invention in connection with the description and showing of the preferred embodiments thereof in the specification, claims and drawings, in which:

Figure 1 is a vertical sectional view taken through a preferred form of a combined hydro-pneumatic suspension and leveling mechanism;

Figure 2 is a greatly enlarged sectional view taken along line II—II of Figure 1;

Figure 3 is an enlarged sectional view of a portion of the valve assembly as removed from the full assembly of Figure 1, and showing another preferred form of valve construction;

Figure 4 is another view similar to Figure 3 and showing another preferred form of valve construction;

Figure 5 is an enlarged sectional view taken along line V—V of Figure 4;

Figure 6 is a sectional view similar to Figures 3 and 4 and showing another preferred form of valve construction;

Figure 7 is an enlarged sectional view taken along line VII—VII of Figure 6;

Figure 8 is a sectional view illustrating another form of valve assembly;

Figure 9 is an enlarged sectional view taken substantially along line IX—IX of Figure 7.

Figure 10 is a sectional view illustrating another form of valve construction; and Figure 11 is an enlarged sectional view taken along line X—X of Figure 9.

As shown in the drawings:

In accordance with the principles of the present invention, the entire weight of a vehicle, such as an automobile, with the exception of the unsprung weight, is supported by a hydro-pneumatic leveling strut 17. The strut, as shown in detail in Figure 1, is provided in similar form for each of the wheels of the vehicle. For purposes of leveling, high pressure hydraulic liquid is supplied to the struts, and the amount of liquid received thereby is internally controlled by a valve assembly, as will be described. In the system illustrated, a continual flow of hydraulic liquid flows through the strut with the quantity determining the level at which the frame of the vehicle is supported relative to the wheel.

The details of the leveling strut 17 of the present invention may be more clearly seen from a consideration of the enlarged cross-sectional view of Figure 1. As there shown, the hydro-pneumatic leveling strut 17 comprises a spherical joint 18 connected to an axle housing for the vehicle. The tubular strut housing 30 carries a guide bearing 31 at its upper end for reciprocably supporting a second tubular member 32. As may be seen, the tubular members 30 and 32 combine to provide a strut chamber 33. The amount of liquid in the chamber 33 will, of course, establish the length of the strut with any given pressure in the pneumatic spring 20.

The pneumatic spring is formed by an outer generally cylindrical housing 34 and the external surface of the tubular member 30. A resilient bladder member 35 is retained in position between the members 30 and 34 by means of bead connections 36 and 37 to be described in more detail later.

The space between the bladder 35 and the outer cylindrical member 34 is filled with air under pressure, which pressure may in conventional practice approximate eight hundred pounds per square inch for a vehicle having the weight somewhat in excess of three thousand pounds. This pressure acts through the bladder 35 directly on a body of liquid in chamber 38 formed by the inner wall of the bladder 35 and the outer surface of the member 30. The liquid in the chamber 38 is in liquid communication with chamber 33 via openings 39 in the wall of the member 30 and via shock absorber ports 40 and 41 in a shock absorbing plate member 42. As a result of the arrangement described, hydraulic liquid under pressure in chamber 33 may move back and forth into the spring chamber 38 at a rate controlled only by the somewhat restricted orifices 40 and 41 which act to dampen the oscillation of the system.

Hydraulic liquid is injected into the strut chamber 33 via a high pressure conduit 23 from a pump. The liquid passes through check valve 45, conduit 46 and through a flow control valve assembly 46a. This assembly controls the continual flow of hydraulic liquid into the strut chamber 33, and regulates the flow so that the strut will maintain a constant length to obtain automatic leveling of the vehicle regardless of the load which is placed on the frame.

The flow of hydraulic liquid into the strut chamber 33 passes from conduit 46 down through the interior of an elongated tubular flow-conducting valve member 53, having an inner elongated cylindrical member 70. The flow-conducting valve member 53 telescopically receives a mating valve stem or core 47. The stem or needle valve core 47 is substantially cylindrical in shape, and has a maximum outside diameter slightly less than the minimum inside diameter of a circular wall 49 defining an orifice 48. This circular wall 49 is set into the end of the flow-conducting tubular valve member 53, and provides an area of reduced diameter. The needle valve stem or core 47 has sections 50 and 56, with section 50 being of smaller diameter and section 56 being of larger diameter. The portion of the valve stem between the minimum diameter portion 50 and the maximum diameter portion 56 is tapered, as shown at 51, to prevent an abrupt reduction in available flow area through orifice 48 with relative movement between the valve stem 47 and the flow-conducting tubular valve member 53, such as will occur with expansion or contraction of the strut 17. It will be observed that the hollow tubular valve portion 53 is supported at its upper end to the upper portion of the strut and the stem 47 is connected at its lower end to the lower portion of the strut so that with compression and expansion of the strut, such as will occur with change in load on the vehicle frame, or such as will occur with shocks to the wheel of the vehicle, the valve will move telescopically together or apart in accordance with the compression or expansion of the strut.

It has been found in devices heretofore used that as a result of the high pressure fluid flow through the orifice 48, a vibration of the core 47 will occur, with resultant objectionable noise. In order to obviate this difficulty, means have been provided to insure that the valve parts will remain in fixed relative lateral positions. In one form, this has been accomplished by providing means to retain continued engagement between the core or stem 47, and the inner surface of the chamber 70 in the flow-conducting valve member 53.

In one form, a biasing spring 52 has been applied to the outer surface of the orifice tubular member 53 and is in sliding, transversely biasing contact with the core 47 as at 54. As shown in detail in Figures 1 and 2, the biasing spring 52 applies a pressure to hold the valve core or stem 47 firmly against the inner surface 49 of the orifice or wall member 48, such as at 52a.

The vibration of the valve stem or core 47, is highly undesirable, and may be damped in manners other than that illustrated in Figures 1 and 2. Specific forms of structures for preventing the vibration of the stem 47 will be described later in connection with Figures 4 through 7.

Liquid is continuously bled from the chamber 33 via a calibrated orifice generally indicated at 60 comprising a combined high pressure filter arrangement and removable orifice. As may be seen, the filter comprises a cylindrical casing 61 having annular grooves 62 around the surface thereof. The grooves 62 are covered by a very fine screen having holes approximately .004 inch in diameter on a 100 hole per inch checkerboard arrangement. The screen 63 is preferably soldered to the housing 61 and the annular grooves 62 are ported to a central bore 64 by means of ports 65. The bore 64 is plugged with a removable orifice 66 having a calibrated orifice aperture 67 approximating .020 inch diameter. A check valve 68 is provided in the conduit 24 to assure isolation of the individual struts from each other. This valve is a precautionary measure and the spring 69 controlling the valve is sufficiently light to prevent the check valve 68 from causing a build-up of pressure in the orifice such as to affect the leak-down function thereof.

A specific relationship is provided between the orifice 67 and the maximum and minimum flows permitted through the valve orifice 49. The maximum flow permitted through the orifice 49, when the minimum diameter 50 of the core 47 is positioned in the aperture, is in excess of the flow permitted through the orifice 67. On the other hand, the minimum flow permitted through the orifice 49, i.e., when the cylindrical portion 56 of the core 47 is in the aperture 49, is less than the flow permitted through the orifice 67. Accordingly, when the strut 17 is extended beyond the point in which the tapered portion 51 of the core 47 enters the orifice 49, fluid will leak from the chamber 33 at a greater rate than it is is introduced, thereby causing the strut to return to a position in which the tapered portion 51 is just entering the orifice 49. On the other hand, if the cylindrical core 47 is positioned such that the minimum diameter portion 50 is in the orifice 48 and the strut is, accordingly, overly collapsed, fluid will flow in through the conduit 23 and through the orifice 49 at a rate greater than the leak-down rate through the orifice 67, thereby causing an increase in pressure in the chamber 33 and a resultant expansion of the strut to the point at which the tapered portion 51 moves slightly into the aperture 49.

In operation of the vehicle over rough roads, it will be apparent that the valve core 47 will reciprocate rather rapidly within the cylindrical tube 53. As a result of this rapid reciprocation, it is possible that inertia of the liquid in area 70 will cause a pulse sufficiently great to cause buckling of the tube 53 or the relatively thin stem 50 of the core 47. In order to prevent any such occurrence, a by-pass 71 is provided between the chamber 70 and the chamber 33. This by-pass is provided with a check valve 72 biased by spring 73 in the direction tending to close the check valve at all times except when a pressure is built up in the conduit 46 substantially heavier than permitted by the spring 73 closing the check valve 72. As a result, the valve 72 opens only upon the application of a rapid and substantial build up of pressure in the conduit 46, which pressure is greater than the pressure in chamber 33. As a result of this check valve action, it will be apparent that over rough roads and in any other circumstance in which movement of the core 47 is sufficiently rapid to cause a liquid compression, liquid is positively force pumped into the chamber 33 from the chamber 70, and, hence, from the supply of high pressure fluid. The continuous leak-down system, however, prevents the strut from over-extending under any circumstances.

Damping action is incorporated into the strut as above mentioned, through the provision of a damper valve plate 42 in the fluid connection between the chambers 38 and 33. As may be seen in Figure 1, the damping mechanism illustrated comprises a pair of disk-shaped spring valves 40a and 41a cooperating respectively with abutment surfaces 40b and 41b. It will be seen that liquid flow from chamber 33 to chamber 38 will be normally via orifice 40 and past spring check valve 40a.

On the other hand, return flow of the fluid from chamber 38 to chamber 33 will be via orifice 41 and spring check valve 41a. This arrangement provides a simple yet effective damping action by controlling the permissible rate of flow back and forth between the strut chamber 38 and the hydro-pneumatic spring chamber 33.

An important feature of the invention illustrated in the present application is the concentric nature of the pneumatic spring. As will be recalled, the liquid chamber 38 is formed in a simple manner by the outside surface of the main strut tube 30 while the spring wall or bladder 35 provides an extremely simple resilient spring construction. The beads 36 and 37 are rather loosely retained in position between the casing flange 34a and lip 30b and between the casing 34 and the abutment surface 30c, respectively. In the installation as shown, little pressure is exerted on the beads 36 and 37 by the metal housing 34. Instead, the assembly is tightened with the lip 34b in metal-to-metal contact with the inner end surface 30d of the housing or casing, thus accurately positioning the entire housing 34 relative to the member 30. A perfect seal is provided between the liquid chamber 38 and the pneumatic chamber 20 by the pressure in these chambers acting to squeeze the bead 36 longitudinally into tight contact in the corner 30e formed by the inner side surface of the casing flange 34a and the lip 30b and to, likewise, force the bead 37 into the corner indicated at 30f. It has been found that this action of the fluid under pressure operates to provide a very satisfactory seal without any danger whatever of causing an over-compression and hence a rupture of the seal beads 36 by squeezing the beads between two adjacent metal surfaces. In addition to the simple and important sealing technique above discussed, it will be noted that the bladder 35 is prevented from rupture at the passageway 39 by means of an annular baffle 39c which operates to cover the ports 39 and prevent direct entry of the bladder thereinto. In the absence of such provision it has been found in some installations that rapid flexing of the bladder 35 under spring conditions is apt to cause an attempted movement of the bladder into the apertures 39 with a resultant blow out. Such blow outs are completely prevented by the present structure.

As illustrated in detail in Figure 1, the joint 18 comprises a cap member 82 which is secured to the wheel axle by means of conventional cap screws 82a and 82b passing through threaded bosses 83 and securing the joint to brackets 14 and 15 which are part of the axle housing. It will be seen that a ball socket is provided by the above arrangement and the ball provides a fastening device for maintaining the strut components in assembled relation. Dirt or other foreign matter is prevented from entering the bearing surface of the joint by means of an annular rubber seal member 87 thereby providing a compact, sealed-for-life unit readily capable of disassembly to permit servicing of the internal parts of the strut should such become necessary.

The upper end of the strut is mounted to the frame 10 by means of a joint 19 comprising a generally conically shaped rubber mount 90. The frame 10 is provided with a conically dimpled annular surface 91 having an outturned lip 92, as shown in Figure 1 and the rubber mount 90 is provided with a metal outer annulus of conical shape 93 having an included angle substantially the same as the included angle of the conical surface 91. The metal annulus 93 is provided with a lip 94 and an annular spring retaining clip 95 is snapped into position between the upstanding lips 92 and 94, as illustrated. This positively locks the mount 90 to the frame 10 in an extremely simple and yet secure manner. The rubber mount 90 is secured to the tubular member 32 by a snap ring 97, in groove 96, against the inner sleeve 98 of the mount 90 urging the sleeve 98 fixedly against abutment shoulder 99 which in turn clamps the dirt shield 100 against abutment surface 101 co-operating with shoulder 102 of the member 32. As a result of this arrangement, it will be seen that all vertical forces transmitted between the wheel axle and the frame 10 in a direction tending to raise the frame 10 will be transmitted directly through the rubber 90.

The conical shape of the mount 90 is of substantial importance in the present leveling system. The rubber material of the mount is preferably of approximately 60 to 70 durometer hardness and the provision of a substantially conical shape with a backing plate 99 provides a variable spring rate for the mount.

As illustrated in Figure 3, a control valve assembly 116 may be adopted and employed in combination with the strut in place of the valve arrangement illustrated at 46a in Figure 1. The valve 116 includes an elongated tubular flow-accommodating member 117 with a central elongated cylindrical passageway 118. Inserted into the free end of the valve member 117 is an annular wall member 119 defining a flow orifice 120.

An elongated valve stem or core 122 extends telescopically into the first valve member 117. The tubular flow-conducting member 117 is anchored at its upper end, while the stem or core 122 is anchored at its lower end in an opening 123 in the head of a supporting stud 124. The opening 123 extends coaxial with the stud 124, and the valve core or stem 122 is given a permanent lateral set so that its normal position will be such as that shown by the dotted line position of the stem 122. Thus, the stem will have to be deflected to telescopically enter the flow-conducting valve member 117, and will continually ride against the side of the orifice 120. The pressure of the stem against the side of the orifice caused by its permanent set, will prevent any lateral movement or vibration, such as will tend to occur with the high pressure flow through the orifice 120. The stem 122 is again provided with a first enlarged portion 125 which joins a reduced portion 126, so that the flow through the orifice 120 will be controlled in accordance with the relative position of the two valve members 117 and 122.

Another form of a valve assembly 127 is illustrated in Figure 4, which is capable of preventing vibrations such as are accentuated by the shocks transmited through the noncompressible hydraulic leveling fluid when road shocks are encountered by the wheel of the vehicle. The valve 127 is provided with an elongated, tubular, flow-conducting member 128 having a central chamber or passage 129 therethrough. A flow restricting annular wall member 130 is set into the end of the flow-conducting valve member 128, and provides a flow orifice 131. The flow-conducting valve member 128 telescopically receives a valve stem or core 132, which again is supported on a stud 133 so as to extend coaxially into the flow chamber within the flow-conducting valve member or tube 128.

The valve stem 132 is provided with an enlarged free end 134 and a reduced inner end 135. As with the valve stems of the other embodiments, relative movement of the stem 132 relative to the tubular valve member 128 will control the flow of hydraulic liquid through the valve.

To prevent lateral movement between the valve members 128 and 132, a guiding annular bushing 136 is located between the flow-conducting valve member 128 and the stem 132. As illustrated in Figure 5, the bushing 136 is provided with a plurality of flow passages 137 which are of total cross-sectional area greater than the available cross-sectional flow area of the orifice 131 so that the orifice will control the quantity of flow through the valve member. The bushing may be secured either to the inner wall of the flow-conducting valve tube 128 or to the surface of the larger end 134 of the stem 132, but is preferably connected to the tube. It will be observed that the bushing positively insures continual surface engagement between the valve members through the bushing, and positively prevents the possibility of lateral vibration.

Another form of valve assembly 138 is illustrated in Figures 6 and 7. In this construction, a tubular flow-conducting valve member 139 has a hollow axial flow passageway 140 therethrough, and telescopically receives a valve stem member 141. The end of the flow-conducting valve member 139 receives an annular wall member 142, having an inner surface 143 to define a flow orifice. In this instance, the outer diameter of the stem 141 is such that it slides snugly within the inner surface 143 of the wall member 142. The stem 141 is provided with elongated relieved portions, such as illustrated at 144 and 145 to provide flow passageways past the wall member 142. Thus, when the valve stem 141 telescopes into the flow-conducting valve member 139 to a point where the ends 146 of the grooves 144 and 145 clear the inner surface 143, the flow through the valve assembly will be increased. When valve stem 141 is withdrawn to where the ends 146 of the grooves enter the inner surface 143 the flow will be decreased.

To obtain a minimum flow and a continued flow through the valve, a continuation groove may be provided in the valve stem, such as illustrated at 147, and the size of the groove 147 will determine the quantity of minimum flow. This may be accomplished by a groove of a special size, or by providing extensions of the grooves 144 and 145, which are reduced from their size at the lower portion of the stem 141.

The valve stem 141 is supported at its end by a supporting bolt 148. The provision of the stem with the wall insert 142, which slidably receives the stem, prevents vibration of the free end of the valve stem with use of a valve thereby eliminating the generation of noise and the natural wear and fatigue of the metal structure of the valve parts.

In the form of the valve assembly shown in Figures 8 and 9, a valve tube 150 is provided which slidably receives a valve stem 151. As in previous constructions, the tube 150 is connected to one end of the strut and the stem 151 is connected to the other end so that the stem will move telescopically and out of the tube with compression and expansion of the strut.

The tube 150 is hollow and provides a fluid passageway 152. At the end of the tube an annular orifice defining insert 153 is provided secured within the end of the tube and having a cylindrical inner surface 154. The insert 153 provides an orifice for the flow of hydraulic fluid and also provides a guide for the valve stem 151.

The valve stem 151 has a cylindrical outer surface 155 which is slidably received by the inner surface 154 of the insert 153 with sufficient snugness to prevent any lateral movement of the valve stem 151 within the insert 153. To provide a flow passage for the hydraulic liquid into the chamber of the strut, the valve stem is provided with a single channel or groove 156. The groove 156 narrows at its upper end 157 and becomes deeper at its lower end 158. The groove also terminates at its upper end at a location short of the end 159 of the valve stem. In operation, the strut will retain a length so that a portion of the groove 156 will always be exposed to the passageway 152 to provide for a continued flow of liquid.

The groove 156 tapers from its upper end 157 to increase in depth toward the end 158. This will effect an increase in flow proportional to the distance which the stem 151 is inserted into the tube. With a very heavy load on the frame of the automobile, which causes the strut to collapse a considerable distance, a rapid recovery will immediately begin since the stem 151 will be pushed into the tube to a point where the lower larger end 158 is within the orifice defining insert 153. As the strut recovers its length, the stem will move out of the tube and the flow of hydraulic liquid will decrease as the shallower part of the groove moves into the orifice defining insert 153.

In the valve assembly shown in Figures 10 and 11, the feature of the rate recovery of the length of the strut proportional to the degree to which it is collapsed is also achieved. In this form of the valve this is accomplished by providing a tapered flattened area 160 on a valve stem 161.

The valve has the same general construction with a valve tube 162 being hollow to provide a flow passageway 163. The end of the tube receives an annular orifice defining insert 164, which has a cylindrical internal surface 165 to fit relatively snugly around the valve stem 161 and prevent any lateral movement therein. This prevents any noise generation or wear-causing vibration with operation of the valve.

The flat area 160 on the valve stem 161 provides a flow passage 166 through the orifice defining insert 164. While the strut has its normal length, a small portion of the upper end 167 of the flat area 160 on the valve stem will be located in the passageway 163 to insure continued flow of hydraulic fluid. As the strut is collapsed, the quantity or rate of flow past the stem will be proportioinal to the amount the stem 161 is inserted into the tube inasmuch as with an increase in amount of insertion, a broader part of the area 160 will be located within the orifice defining insert 164.

It will be observed that various modifications of the above structures may be employed within the spirit and scope of the invention. For example, with respect to the embodiment of Figure 3, it would be feasible under some circumstances to provide a set in the normal position of the tubular flow accommodating member 117, rather than in the stem member 122. Further modifications in structural expedients may be adopted, such as by reducing the end of the tubular valve members 117, 128 or 139 in size rather than providing a separate insert to provide an orifice at the end.

Thus, it will be seen that I have provided an improved automatic suspension system and leveling mechanism for road vehicles of the type hereinbefore described, and having the objects and advantages above referred to. The valve arrangement provided avoids difficulties hereinbefore encountered in that lateral movement and vibration are prevented. The combination of elements function to extend the operating life and prevent the noise attendant with suspension struts and leveling systems heretofore used.

I have, in the drawings and specification, presented a detailed disclosure of the preferred embodiments of my invention, and it is to be understood that I do not intend to limit the invention to the specific form disclosed, but intend to cover all modifications, changes and alternative constructions and methods falling within the scope of the principles taught by my invention.

I claim as my invention:

1. In an automobile leveling system for vehicles having a frame element with an element for supporting a wheel comprising a resiliently expansible hydro-pneumatic telescopic strut supporting said frame element relative to said wheel support element and having an expansible chamber for hydraulic liquid, conduit means connected to said chamber for introducing a flow of pressurized hydraulic liquid into the expansible chamber of said strut to expand said strut and lift said frame element including valve means responsive to the relative position of the frame element and wheel support element to increase the rate of introduction to a high value when said frame element moves downwardly toward said wheel support element and to decrease the rate of introduction when said frame element moves upwardly relative to the wheel support element, said valve means including an elongated hollow flow conducting member connected to said conduit means and defining a flow passageway therethrough into said chamber, an elongated stem member extending telescopically into said flow conducting member and defining a flow path between the outer surface of the stem member and the flow conducting member, one of said members being connected to one part of said expansible strut and the other of said members being connected to another part whereby said members will move telescopically with relative movement between the wheel support and frame elements, one of said members being of changing cross section along its length to increase the flow path between the members as the strut is compressed and decrease the flow path as the strut is expanded, and means insuring continual surface contact between the inner surface of said flow conducting member and the outer surface of said stem member whereby relative lateral movements and vibrations therebetween will be prevented with high pressure flow changes such as occur with road shock.

2. In an automatic leveling system for vehicles having a frame element with a wheel support element comprising a resiliently expansible hydro-pneumatic telescopic strut supporting said frame element relative to said wheel support element and having an expansible chamber for hydraulic liquid, means connected to said chamber for introducing a flow of pressurized hydraulic liquid into the expansible chamber of said strut to expand said strut and lift said frame element including valve means responsive to the relative position of the frame and wheel support elements to increase the rate of introduction to the chamber when said frame element moves downwardly toward said wheel support element and to decrease the rate of introduction when said frame element moves upwardly relative to the wheel support element, said valve means including an elongated hollow flow conducting member defining a flow passageway therethrough into said chamber, an elongated solid stem member extending telescopically into said flow passageway and defining a restricted flow path between the outer surface of the stem member and the flow conducting member, one of said members being connected to one part of said expansible strut and the other of said members being connected to another part whereby said members will move telescopically with relative movement between the wheel support and frame support elements, one of said members being of changing cross section along its length to increase the flow path between the members as the strut is compressed and decrease the flow path as the strut is expanded, and means for preventing lateral movement between said members whereby vibration with intense flow due to road shocks is prevented avoiding noise and fatigue of parts.

3. In an automatic leveling system for vehicles having a frame element with at least one wheel support element suspended therefrom comprising a resiliently expansible hydro-pneumatic telescopic strut supporting said frame element relative to said wheel support element and having an expansible chamber for hydraulic liquid, means connected to said chamber for introducing a flow of pressurized hydraulic liquid into the expansible chamber of said strut to expand said strut and lift said frame element including valve means responsive to the relative position of the frame element and wheel support element to increase the rate of introduction to a high value when said frame element moves downwardly toward said wheel support element and to decrease the rate of introduction when said frame element moves upwardly relative to the wheel support element, said valve means including an elongated hollow flow conducting member defining a flow passageway therethrough into said chamber, and an elongated stem member extending telescopically into said flow passageway, one of said members being connected to one part of said expansible strut and the other of said members being connected to another part whereby said members will move telescopically with relative movement between the wheel support element and frame element, one of said members being of changing cross section along its length to increase the flow path between the members as the strut is compressed and decrease the flow path as the strut is expanded, at least one of said members having a permanent lateral set whereby it will ride along one side of the other member preventing high frequency vibrations with rapid pressure flow of hydraulic liquid such as will occur on encountering road shocks.

4. In an automatic leveling system for vehicles having a frame element with at least one wheel support element suspended therefrom comprising a resiliently expansible hydro-pneumatic telescopic strut supporting said frame element relative to said wheel support element and having an expansible chamber for hydraulic liquid, means connected to said chamber for introducing a flow of pressurized hydraulic liquid into the expansible chamber of said strut to expand said strut and lift said frame element including valve means responsive to the relative position of the frame element and wheel support element to increase the rate of introduction to a high value when said frame element moves downwardly toward said wheel support element and to decrease the rate of introduction when said frame element moves upwardly relative to the wheel support element, said valve means including an elongated hollow flow conducting member defining a flow passageway therethrough into said chamber, an elongated stem member extending telescopically into said flow passageway, one of said members being connected to one part of said expansible strut and the other of said members being connected to another part whereby said members will move telescopically with relative movement between the wheel support element and frame element, one of said members being of changing cross section along its length to increase the flow path between the members as the strut is compressed and decrease the flow path as the strut is expanded, and spring means connected between said members biasing said stem member to one side of said flow passageway whereby lateral vibrational movements are avoided.

5. In an automatic leveling system for vehicles having a frame element with at least one wheel support element suspended therefrom comprising a resiliently expansible hydro-pneumatic telescopic strut supporting said frame element relative to said wheel support element and having an expansible chamber for hydraulic liquid, means connected to the chamber for introducing a flow of pressurized hydraulic liquid into the expansible chamber of the strut to expand said strut and lift said frame element including valve means responsive to the relative position of the frame element and wheel support element to increase the rate of introduction to a high value when said frame element moves downwardly toward said wheel support element and to decrease the rate of introduction when said frame element moves upwardly relative to the wheel support element, said valve means including an elongated hollow flow conducting member defining a flow passageway therethrough into said chamber, an elongated stem member extending telescopically into said flow passageway, one of said members being connected to one part of said expansible strut and the other of said members being connected to another part whereby said members will move telescopically with relative movement between the wheel and frame, one of said members being of changing cross section along its length to increase the flow path between the members as the strut is compressed and decrease the flow path as the strut is expanded, and a guide member located within said flow conducting member and extending across the space to said stem member with flow areas defined therethrough whereby relative lateral movement between said members is prevented without restricting flow.

6. In an automatic leveling system for vehicles having a frame element with at least one wheel support element suspended therefrom comprising a resiliently expansible hydro-pneumatic telescopic strut supporting said frame element relative to said wheel support element and having an expansible chamber for hydraulic liquid, means connected to the chamber for introducing a flow of pressurized hydraulic liquid into the expansible chamber of said strut to expand said strut and lift said frame element including valve means responsive to the relative position of the frame element and wheel support element to increase the rate of introduction to a high value when said frame element moves downwardly toward said wheel support element and to decrease the rate of introduction when said frame element moves upwardly relative to the wheel support element, said valve means including an elongated hollow flow conducting member defining a flow passageway therethrough into said chamber, an elongated stem member extending telescopically into said flow passageway and defining a flow path between the outer surface of the stem and the inner surface of the flow conducting member, one of said members being connected to one part of said expansible strut and the other of said members being connected to another part whereby said members will move telescopically with relative movement between the wheel support element and frame element, wall means defining a location of reduced cross-sectional area at one location along said flow conducting member, said stem member having a lateral dimension to radially engage opposing radial locations at the side of the wall means so that lateral movement between said stem and flow conducting members is prevented by said wall means, and means defining relieved areas for elongated flow paths in said stem member of a limited length whereby flow will be increased when said stem member is positioned with the relieved areas opposite said wall means.

7. In an automatic leveling system for vehicles having a frame member supported above at least one wheel support member by an expansible strut comprising a resiliently expansible hydro-pneumatic strut supporting a frame member relative to a wheel support member and having an expansible chamber for hydraulic liquid, means connected to the chamber for introducing a flow of pressurized hydraulic liquid into the expansible chamber to expand the strut and lift the frame member including a valve assembly responsive to the relative position of the frame member and wheel support member to increase the rate of introduction of liquid to the chamber when the frame member moves downwardly toward the wheel support member and to decrease the rate of introduction of liquid into the chamber when the frame member moves upwardly relative to the wheel support member, said valve assembly including a flow conducting member having an inner surface defining a flow orifice for accommodating the flow of hydraulic liquid into the strut chamber, said flow conducting member being connected to one end of the strut, and an elongated stem extending telescopically through said flow orifice and being connected to the other end of the strut whereby the stem will move relative to said orifice with expansion and contraction of the strut, said stem fitting relatively snugly within said orifice to prevent relative lateral movement, and means defining a groove in the surface of said stem with the groove extending along the stem and having a cross-sectional flow area of decreasing dimension toward the end of the stem which projects through said orifice whereby the flow of liquid through the orifice will increase as the stem is inserted further through the orifice and will decrease as the stem is withdrawn.

References Cited in the file of this patent

UNITED STATES PATENTS

| Number | Name | Date |
|---|---|---|
| 483,529 | Bryon | Oct. 4, 1892 |
| 483,829 | Bryon | Oct. 4, 1892 |
| 1,595,330 | Woodward | Aug. 10, 1926 |
| 1,819,414 | Gruss | Aug. 18, 1931 |
| 1,956,668 | Charles | May 1, 1934 |
| 1,961,747 | Ewart | June 5, 1934 |
| 2,313,242 | Johnson | Mar. 9, 1943 |
| 2,616,687 | Butterfield | Nov. 4, 1952 |
| 2,802,664 | Jackson | Aug. 13, 1957 |
| 2,856,180 | Westcott | Oct. 14, 1958 |
| 2,883,181 | Hogan | Apr. 21, 1959 |

FOREIGN PATENTS

| Number | Country | Date |
|---|---|---|
| 1,100,585 | France | Apr. 6, 1955 |